United States Patent [19]
Bell et al.

[11] 3,892,595
[45] July 1, 1975

[54] STORAGE BATTERY WITH SINGLE FILL VALVE

[75] Inventors: James E. Bell, Canoga Park, Calif.; Robert P. Laczko, Cuyahoga, Ohio

[73] Assignee: ESB Incorporated, Philadelphia, Pa.

[22] Filed: Apr. 5, 1974

[21] Appl. No.: 458,108

[52] U.S. Cl. ............... 136/162; 136/170; 136/178
[51] Int. Cl. ........................................... H01m 1/02
[58] Field of Search ............ 136/162, 170, 177, 178

[56] References Cited
UNITED STATES PATENTS

| | | | |
|---|---|---|---|
| 1,633,224 | 6/1927 | Ogden | 136/162 |
| 2,220,005 | 10/1940 | Smith | 136/178 |
| 3,630,786 | 12/1971 | Ibaraki | 136/170 |
| 3,772,087 | 11/1973 | Schmechtig | 136/162 |

*Primary Examiner*—Donald L. Walton
*Attorney, Agent, or Firm*—Wm. Wharton Smith; Robert H. Robinson, Esq.; Anthony J. Rossi, Esq.

[57] ABSTRACT

A multicell lead acid storage battery is fitted with a one piece cover. A rotatable disc valve is mounted on the cover, the valve being of such a size that it covers a portion of all cells. A filling well and a vent opening for each cell are located under the disc valve. In a first angular position of the valve, the filling wells are exposed and the vent openings are sealed, and in a second position, the wells are closed and the vents are opened. When the wells are exposed, the passages into the cells are clear, expose the top of the cell elements and permit the insertion of a hydrometer into the cell. In order that the top of each element is exposed, the location of the center cell filling wells and vent openings are nearer the axis of the valve than the openings in the two end cells. Rotation of the valve may expose a legend relating to the valve position.

8 Claims, 9 Drawing Figures

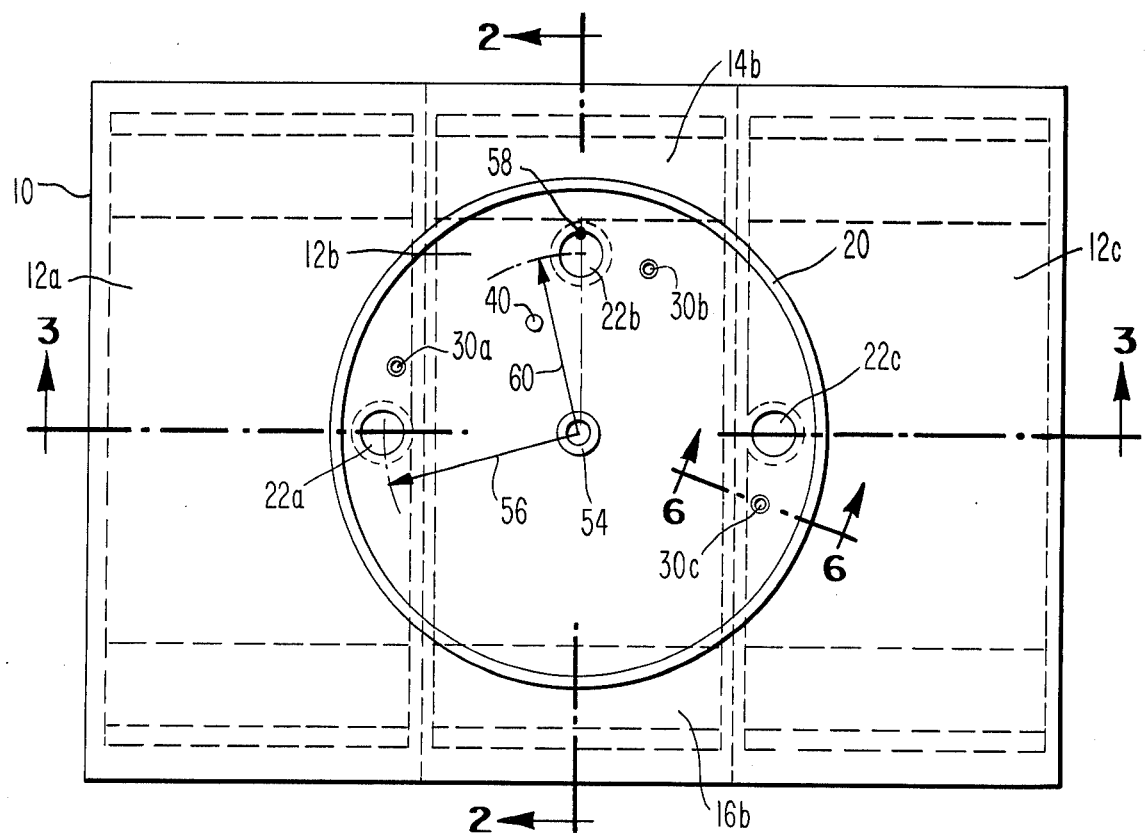

STORAGE BATTERY WITH SINGLE FILL VALVE

BACKGROUND OF THE INVENTION

1. Field of the Invention

This invention relates to secondary lead acid storage batteries. In particular, it relates to closures for such batteries.

2. Description of the Prior Art

Storage batteries used for cycle service such as the propulsion of golf carts, etc., require frequent addition of water.

In the operation of storage batteries and particularly when the batteries are used in cycle service, it is often desirable to have direct access to the interior of the cells. It is occasionally desirable to look into the cell and it is occasionally mandatory to determine the strength of the electrolyte. This measurement is usually made by means of a hydrometer. A sample of electrolyte is withdrawn from the cell and its density determined by a calibrated float. To provide for this access, a filling well is usually provided having a direct opening into the cell of about ½ inch or greater diameter.

The element of a storage cell comprises positive plates, negative plates and separators. The positive plates are electrically connected together by a positive strap and the negative plates by a negative strap. The straps are usually located at the top of the element and extend above the plates and separators. They are quite large. If a filling well should be located over a strap, it is not possible to have a good view of the cell element, and it is not possible to obtain an acid sample from the cell if the level is below the top of the strap.

Such batteries are often built in 3 or 4 cell containers. In standard designs, each cell has a vent plug which must be removed and replaced when the battery is watered. Numerous devices have been proposed to simplify the watering of such cells. A rotary valve has been described, located on the top of a 3 cell battery which in a first position opens circuitous passages leading to the cells. These passages serve to allow water to be introduced into the cells and provide for self leveling, but they will not allow for a direct visual inspection of the cell interior or permit the taking of hydrometer readings. In a second position, the cells are vented for normal operation. In order to take hydrometer readings, an additional opening with a cover is provided for each cell.

Single cell vent valves have been described which in a first position allow for direct communication to the cell interior for addition of water to a predetermined level or for taking hydrometer readings, etc., and in a second position provide venting for normal operation.

SUMMARY OF THE INVENTION

A multi-cell storage battery is equipped with a single piece cover having sections covering each of the cells. A rotatable disc valve is located on top of the cover of such a size as to cover portions of the top of each cell. A filling well and a vent opening for each cell is located in that portion of each cover section covered by the valve disc. A single opening in the valve disc for each cell is positioned alternately for filling the cell and for venting the cell. A ring at the lip of the disc valve may enclose the wells to form a filling cup.

The radial location of the filling wells and vent openings with respect to the axis of rotation of the valve disc is greater for the two end cells than the radial location of the filling wells and vent openings for the intermediate cells of the battery so that the filling well of each cell is located over the cell element proper and not the straps. Rotation of the valve disc from a first filling position to a second venting position may be used to expose a suitable legend for the valve position. Sealing means for sealing the vent opening to the undersides of the valve disc may be provided.

BRIEF DESCRIPTION OF THE DRAWINGS

FIG. 1 represents in plan a battery embodying the present invention with the valve member absent;

FIG. 2 illustrates a first section of FIG. 1;

FIG. 3 illustrates a second section of FIG. 1;

FIG. 4 depicts in plan the valve member of the present invention;

DESCRIPTION OF THE PREFERRED EMBODIMENT

Figure 5:
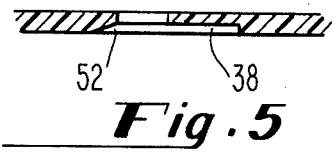
FIG. 5 illustrates a first section of FIG. 4.

FIG. 1 depicts the top of a 3 cell storage battery having 3 compartments, one for each cell. Item 10 represents the cover, 12a, 12b, 12c represent the cells complete with battery elements. FIG. 2 representing cross section 2—2 of FIG. 1 shows the top of element 12b with positive strap 14b connecting positive plates together and strap 16b connecting the negative plates together. The straps also serve to position the separators 18. The construction of the cells and elements is well known in the art and has been used for many years. Cover 10 comprises 3 sections, one covering the first end cell 12a, a second covering the center cell 12b and a third covering the second end cell 12c. A ring 20 may be formed on the top of the cover 10. This ring is sufficiently large in diameter to encompass portions of the three sections of the cover as shown in FIG. 1.

Filling wells 22a, 22b and 22c are formed by the cover within the confines of the ring 20. Each filling well comprises a hole through the cover and a dependent collar extending downward from the underside of the cover to a selected electrolyte level. This is shown in FIG. 2 and FIG. 3, FIG. 2 being cross section 2—2 and FIG. 3 being cross section 3—3 of FIG. 1. In FIG. 2, filling well 22b is shown with opening 24b and dependent collar 26b. The desired electrolyte level is indicated by line 28. The purpose of the filling wells is twofold. First, they provide a suitably large opening into the cell to allow for filling the battery with electrolyte during manufacture and monitoring the electrolyte level during the life of the battery. They also serve to provide a direct access to the cell interior so that the top of the element may be visually inspected and so that hydrometer readings (acid strength) may be taken when and if a battery condition check is desired. To fulfill those requirements, the filling well must be a straight direct opening from the top of the cell cover to the top of the element. A second series of openings are also provided. These are vent openings 30a, 30b and 30c, FIG. 1, connecting the interior of cells 12a, 12b and 12c respectively to the outside. In order that the cells will not be filled above the desired filling level, it is necessary that the vents 30a, 30b and 30c are closed off at the time of filling. During normal battery operation, the vent openings should be open and the filling wells closed.

In order to close the vent openings and alternately the filling openings, the battery of the present invention is provided with a manually operated disc valve. This is shown in cross section at 32 in FIG. 3, and in plain view in FIG. 4. The valve is rotatable about an axis 54 perpendicular to the plane of the battery cover 10. In a first preferred form, the valve has an annular seat section 33, a raised lip portion 37 and a raised handle portion 35. The valve includes three access holes 34a, 34b, and 34c. In FIG. 3, the valve is positioned in a first location so that access hole 34a uncovers filling well 22a, access hole 34c uncovers filling well 22c and though not shown in the figure, access hole 34b uncovers filling well 22b. Valve 32 may be rotated, in the design shown, clockwise, from the position shown in FIG. 3 to a second position where reference point 36a is directly over vent opening 30a, point 36b is directly over vent opening 30b and point 36c is directly over vent opening 30c. In this position, filling wells 22a, 22b and 22c are covered by the undersurface of the disc valve 32. FIG. 5 represents a cross section at 5—5 of FIG. 4 showing valve 32 at the radius of the access hole 34c. It is seen that the underside of the valve disc is relieved in the area indicated by 38c, and including an area around the reference point 36c. Similar relieved areas are provided at 36a and 36b.

When valve a is in the second position, the relief in the underside of the valve provides a vent passage for the escape of battery gasses from the vent opening to the atmosphere via access hole 34c while at the same time providing protection against the direct passage of acid spray through the vent opening to the atmosphere as well as the entry of foreign matter directly into the cell.

Stops may be provided with the valve disc to limit the rotation of the valve to the first and second positions. In one form of stop, protuberance 40 is formed on the cover of the battery. Stops 42a and 42b are formed on a portion of the valve disc so as to interfere with protuberance 40 and limit the rotation of the disc.

It is to be noted that in the preferred form of valve the stops 42a and 42b can be formed within the confines of the raised portion 35 of the valve. In this case, the raised portion 35 also encompasses the protuberance 40 thus protecting the rotation limiting device against misoperation due to foreign matter, etc.

In normal operation of a cycle service battery, water must be added to each cell as often as once every week. To perform this operation with the present device, the valve 32 is turned counter-clockwise to the first position. Water is then poured into the cup formed by the raised lip 37 and the ring 20. It percolates down into each cell via the filling wells until the water level rises to the bottom of the collars 26a, 26b and 26c. At this point, air becomes trapped under the cover of each cell preventing further entry of water. Additional water poured into the cup simply runs over. The user then stops pouring water into the cup and turns the valve clockwise to the second position. The comparatively small amount of water remaining in the cup then dissipates into the three cells to fill them slightly above the limit set by the collars.

Figure 6:
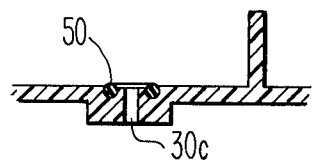
FIG. 6 illustrates a third section of FIG. 1.

It is important that the vent openings 30a, 30b and 30c are tightly sealed, otherwise the levelling means provided by the skirts 26a, 26b and 26c will not be operative. In a preferred embodiment, this is achieved by locating a resiliant seal member such a soft rubber ring or O-ring around each vent. The seal is compressed when the valve disc passes over it, thus sealing the vent opening to the underside of the cover. FIG. 6 showing cross section 6—6 of FIG. 1 embodies O-ring 50 encompassing vent opening 30c. In FIG. 5, a ramp 52 is indicated which co-acts with and serves to compress O-ring 50 as the valve disc 32 passes over it, forcing it against the underside of disc 32 and thus sealing the vent opening to the underside of the disc.

It will be noted that as the valve disc is caused to compress the three O-rings, about the three vent openings there will be a considerable upward thrust upon the valve. Means such as a hold down screw, etc. are needed to combat this thrust. In the design of FIG. 3, a circumferential ring 21 is provided which bears on the raised lip 37 of the valve and locates the valve in the direction perpendicular to its axis. This ring may be cemented or welded to the lip of ring 20.

It is a principal feature of the present invention that the diameter of valve 32 be as small as possible yet retaining the desirable features set out above. A small diameter valve is desirable to reduce cost, to reduce the effects of distortion in the valve or cover members and to allow the maximum area on the battery cover for hold down devices, terminals, etc. To provide the smallest diameter valve vent holes 34a and 34c should be diametrically opposite each other or in other words both holes should be located on a straight line passing through the axis 54 of the valve disc. It will be seen from FIG. 1 that with the geometry of the battery as shown, if the filling well 22b were located on the same radius 56 as that of vents 22a and 22c, see reference point 58, the vent opening would be blocked by the battery strap 14b. In order that filling well 22b is open down to the top of the separators, it is necessary that it is located nearer to the axis 54 of the valve than are filling wells 22a and 22c, or that radius 60 is less than radius 56. With this construction, it is also necessary that the three filling wells are disposed at unequal angles about the axis of the valve and that the three valve openings are all located in a single half at the valve disc.

Figure 7:
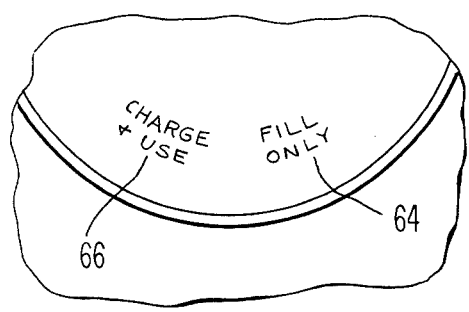
FIG. 7 illustrates a portion of a second embodiment of the cover of FIG. 1.

A further feature of the present design is that operating instructions may be provided by providing a further opening through the disc valve 32. This opening can be used to uncover one or more legends. A suitable opening 62 is shown in FIG. 4. In FIG. 7, a portion of a battery cover such as 10 is shown with the legend "Fill Only" at 64 to be uncovered when the filling wells are uncovered, and the legend "Charge & Use" at 66 to be uncovered when the vent openings are uncovered.

The present invention is not limited to three cell batteries but is suitable for use with batteries having more than three cells in a single container. As the number of cells increase, the teaching of this invention becomes more pertinent.

Figure 8:
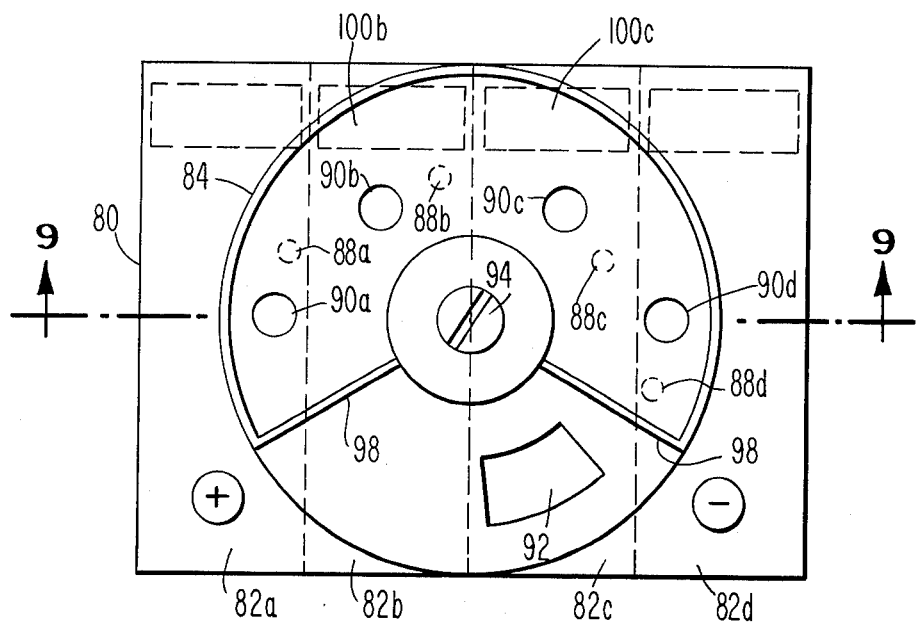
FIG. 8 depicts in plan the invention as applied to a four cell battery.
Figure 9:
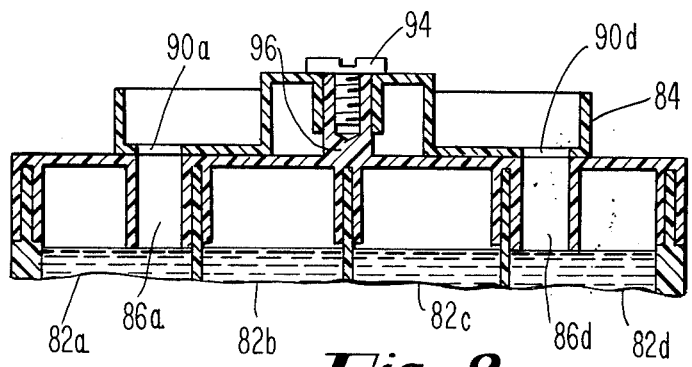
FIG. 9 illustrates a sectional elevation of the battery of FIG. 8 on the cross section 9 — 9.

This is illustrated in FIGS. 8 and 9, showing a four cell assembly of a further embodiment of the invention. In FIG. 8, the cover 80 of the four cell battery is shown with cells 82a, 82b, 82c and 82d. The four cells are also shown in FIG. 9. A disc valve 84 is located so as to cover a portion of each section of the cover covering each cell. Filling wells as at 86a and 86d and vent openings 88a, 88b, 88c and 88d are formed in the cover 80 in the area of the cover covered by valve 84. Access holes 90a, 90b, 90c and 90d are formed in valve 84. A legend opening 92 may be formed in the disc valve. The disc valve is held in place by a fastener such as screw 94 passing into a stationary pivot 96 formed on the top of the cover. An irregular lip 98 serves to form a filling cup of arcuate shape to direct water into the cell openings. It will be seen from FIGS. 8 & 9 that the valve openings 90a and 90d along with filling wells 86a and 86d must be located as far apart as possible in the valve disc so that the valve is not greater in diameter than the width of the battery cover 80. It is also seen that the valve openings 90b and 90c along with filling wells 86b and 86c (not shown, but directly under 90b and 90c in FIG. 8) must be nearer the axis of the valve than openings 90a and 90d in order that they open on the cell elements proper and not on straps 100b and 100c. Also, it can be seen in FIG. 9 that by placing all the valve openings in one half of the valve disc that ample space is allowed in the second half of the valve disc for the position marking and the legend opening 92.

Although the present invention has been described in conjunction with preferred embodiments, it is to be understood that modification and variations may be resorted to without departing from the spirit and scope of the invention as those skilled in the art will readily understand. Such modifications and variations are considered to be within the purview and scope of the invention and appended claims.

We hereby claim:

1. A storage battery including a container with a first end cell compartment, a second end cell compartment and at least a center cell compartment located between the end cells, a cell element including positive plates, negative plates, separators and electrolyte located in each compartment; a single cover fastened to the container the single cover having a first section closing the first end cell compartment, a second section closing the center cell compartment and a third section closing the second end cell compartment; a disc valve rotatable about an axis perpendicular to the cover, located upon and in contact with the cover, areas of the disc covering selected positions of the three sections of the cover; a first filling well located in the portion of the first section of the cover covered by the valve disc, at a distance $a$ from the axis of the disc, the first filling well including a first dependent collar extending downwards from the underside of the cover, a first vent opening through the cover in the portion of the first section of the cover covered by the disc valve at a radius $a$ from the axis of the disc; a second filling well located in the portion of the second section of the cover covered by the valve disc, at a distance $b$ from the axis of the disc the distance $b$ being less than the distance $a$, the second filling well including a second dependent collar extending downwards from the underside of the cover, a second vent opening through the cover in the portion of the second section of the cover covered by the disc valve at a radius $b$ from the axis of the disc; a third filling well located in the portion of the third section of the cover covered by the valve disc at a distance $c$ from the axis of the disc the distance $c$ being greater than the distance $b$, the third filling well including a third dependent collar extending downwards from the underside of the cover, a third vent opening through the cover in the portion of the third section of the cover covered by the disc valve at a radius $c$ from the axis of the disc;

the first filling well and the third filling well being located on a straight line passing through the axis of the disc valve, the first vent opening and the third vent opening being located on a straight line passing through the axis of the disc;

the disc further including a first access hole, a second access hole and a third access hole therethrough the location of the holes being such that when the valve disc is in a first position the first filling well is exposed through the first hole in the disc, the second filling well is exposed through the second hole and the third filling well is exposed through the third hole and when the disc is in a second position, the first vent opening is opened by the first hole, the second vent opening is opened by the second hole and the third vent opening is opened by the third hole.

2. A storage battery as defined in claim 1 including means for sealing the vent openings to the underside of the valve disc when the disc is in the first position.

3. A storage battery as defined in claim 2 wherein the means for sealing the vent openings to the underside of the valve disc includes resiliant members surrounding the openings and held in the cover, co-acting ramps formed in the underside of the valve disc, and limiting means preventing the disc from being displaced by pressure developed between the resiliant members and the underside of the valve disc.

4. A storage battery as defined in claim 1 including means for indicating the first position of the valve disc by exposure of a suitable first legend and for indicating the second position of the valve by exposure of a suitable second legend, the exposure of the first and second legends being effected by the rotation of the valve.

5. A storage battery as defined in claim 1 including a ring formed on the cover surrounding the disc valve so constructed that when the valve is in the first position and water is poured within the confines of the ring, the water will be constrained to flow into the filling wells.

6. A storage battery as defined in claim 1 including at least an additional center cell compartment, a cell element in the compartment, an additional cover section closing the additional center cell compartment, a fourth filling well and a fourth vent opening in the additional cover section and a fourth opening included in the valve disc, the fourth opening in the disc exposing the fourth filling well when the disc is in the first position and the fourth opening in the disc opening the fourth vent opening when the disc is in a second position.

7. A storage battery as defined in claim 1 including a raised lip on the valve disc so constructed that when the valve is located in the first position and water is formed within the confines of the lip the water will be constrained to flow into the filling wells.

8. A storage battery as defined in claim 1 wherein the several access holes included in the valve disc are located in a single half of the valve disc.

* * * * *